F. C. DE LANO.
COIN OPERATED SHOE POLISHING MACHINE.
APPLICATION FILED SEPT. 4, 1917.

1,283,106.

Patented Oct. 29, 1918.
9 SHEETS—SHEET 3.

FRED C. DE LANO INVENTOR
BY Hazard and Miller
ATTYS

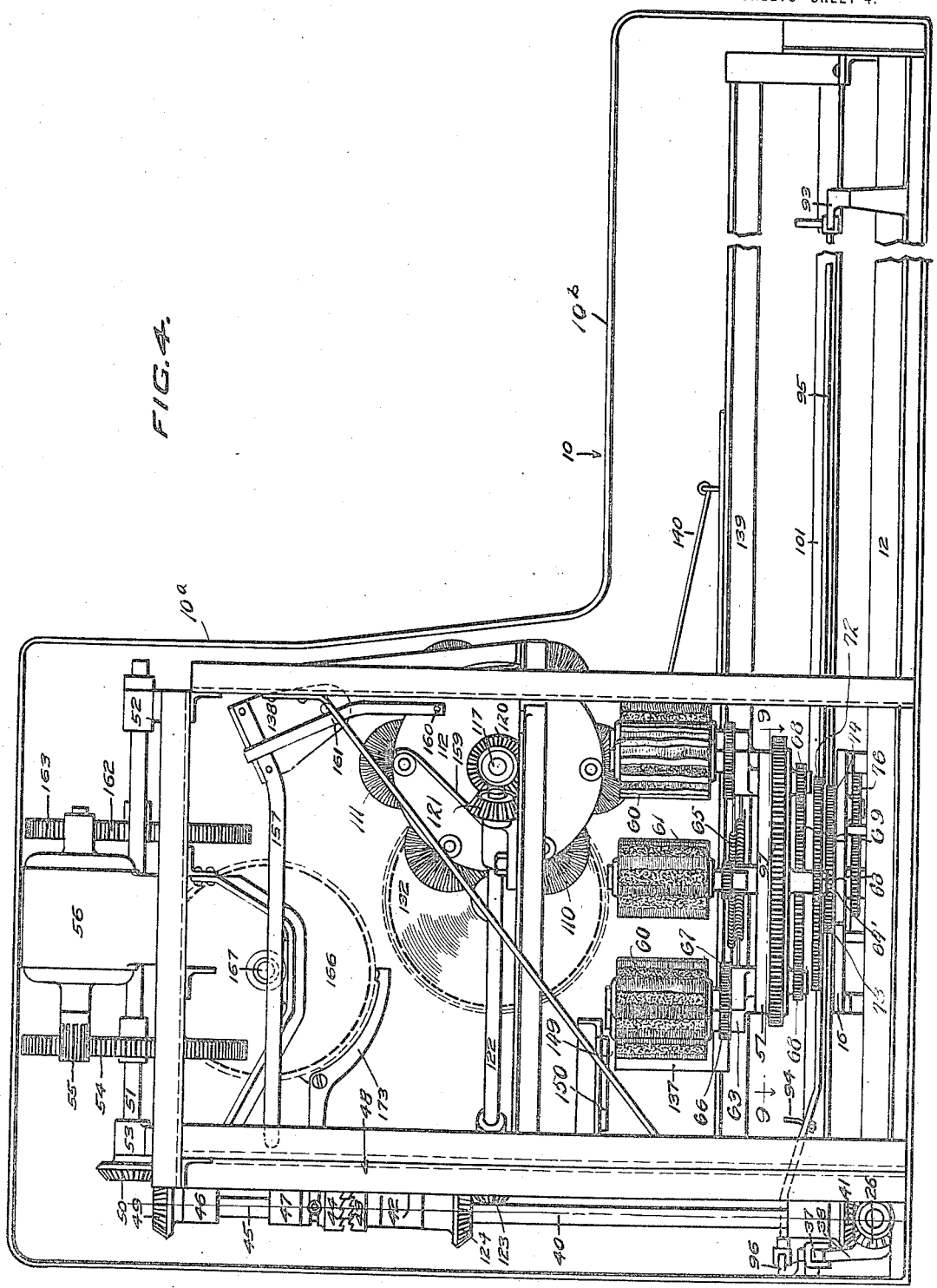

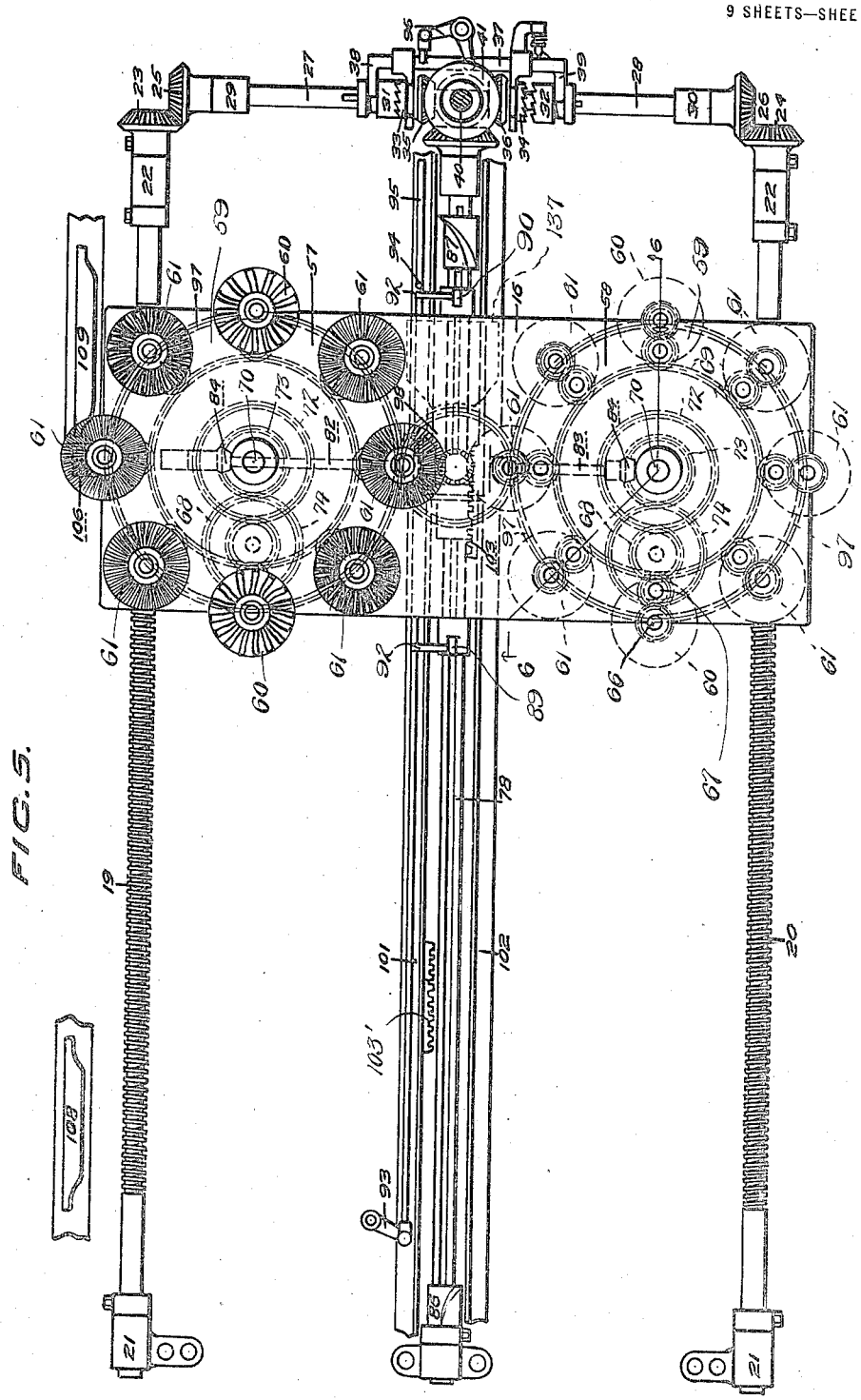

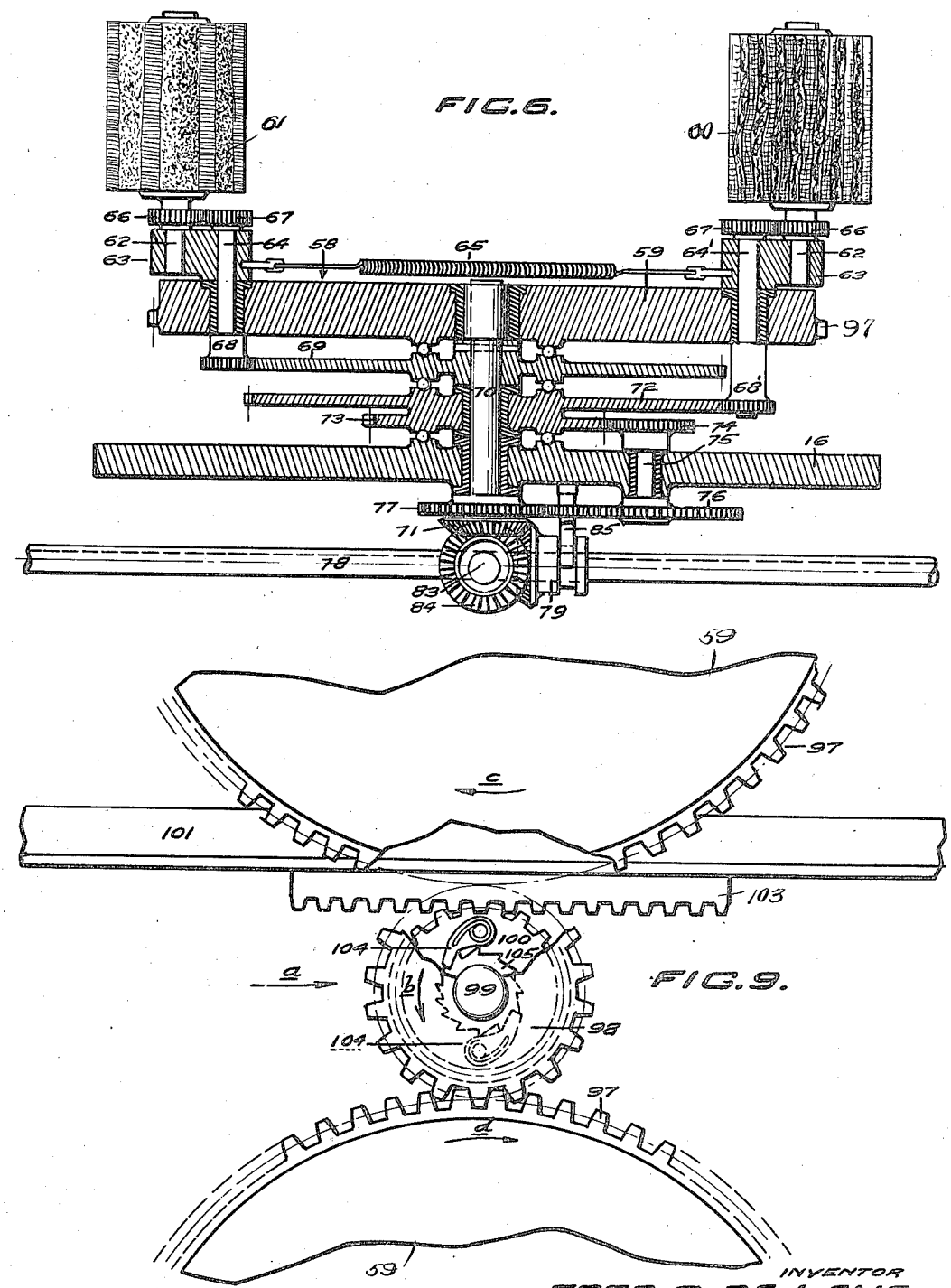

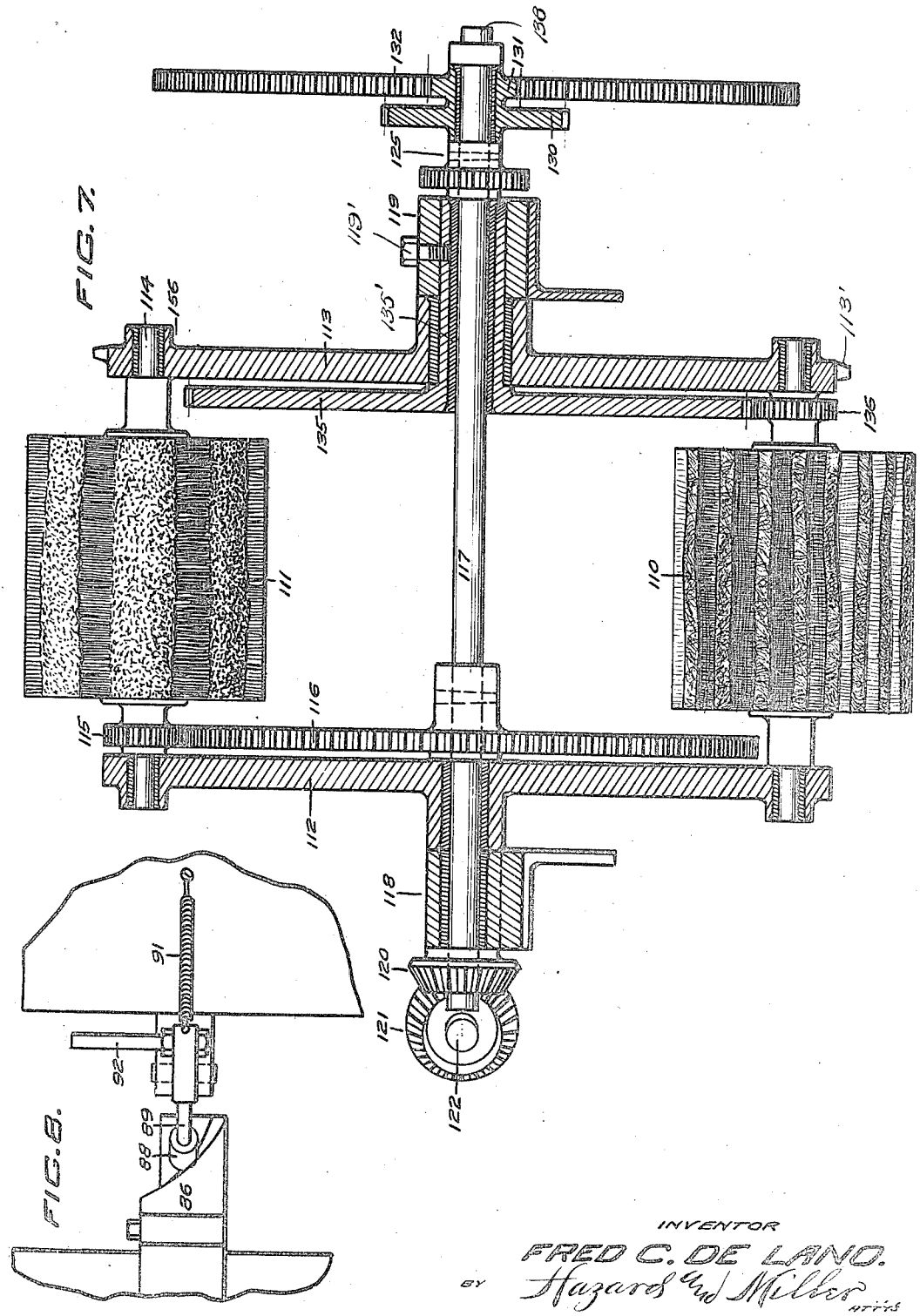

F. C. DE LANO.
COIN OPERATED SHOE POLISHING MACHINE.
APPLICATION FILED SEPT. 4, 1917.

1,283,106.

Patented Oct. 29, 1918.
9 SHEETS—SHEET 8.

INVENTOR
FRED C. DE LANO.
BY Hazard & Miller
ATT'YS

F. C. DE LANO.
COIN OPERATED SHOE POLISHING MACHINE.
APPLICATION FILED SEPT. 4, 1917.
1,283,106.
Patented Oct. 29, 1918.
9 SHEETS—SHEET 9.
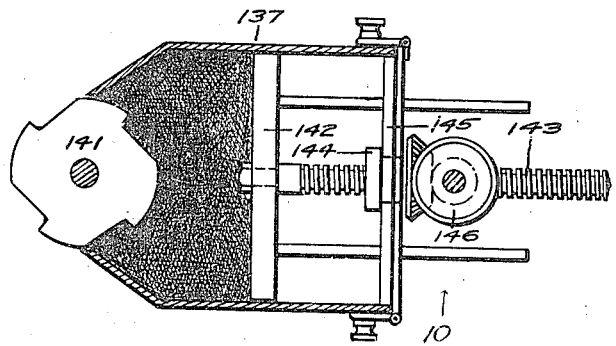
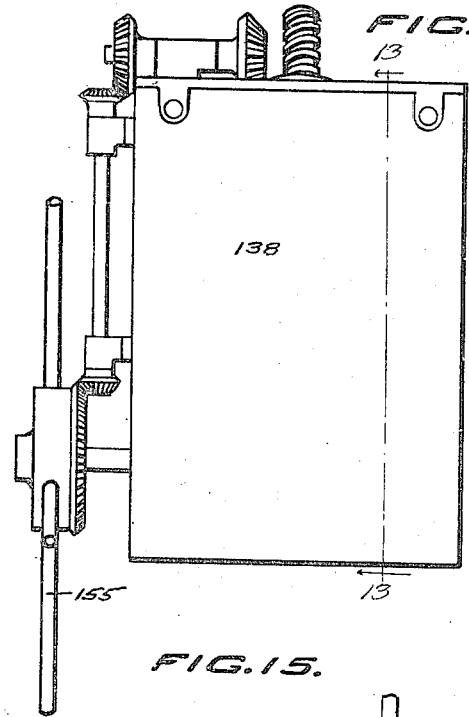
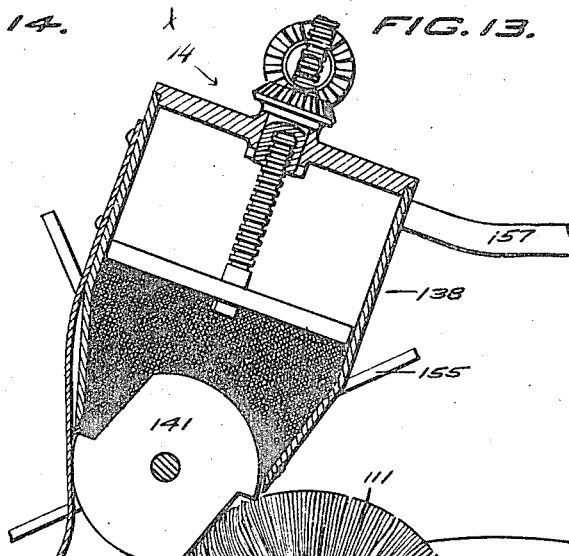
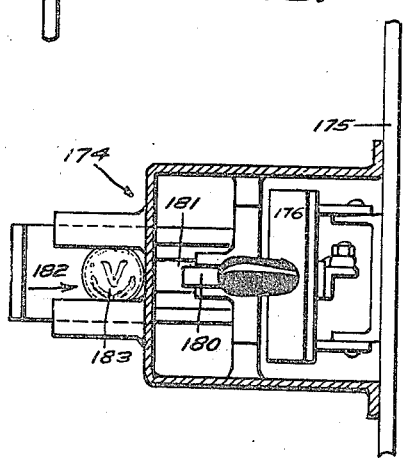
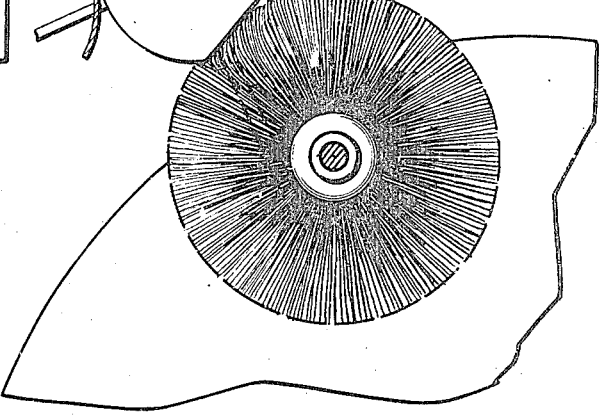
INVENTOR
FRED C. DE LANO.
BY Hazard & Miller
ATT'YS

UNITED STATES PATENT OFFICE.

FRED C. DE LANO, OF LOS ANGELES, CALIFORNIA.

COIN-OPERATED SHOE-POLISHING MACHINE.

1,283,106.　　　　　Specification of Letters Patent.　　Patented Oct. 29, 1918.

Application filed September 4, 1917. Serial No. 189,664.

*To all whom it may concern:*

Be it known that I, FRED C. DE LANO, a citizen of the United States, residing at Los Angeles, in the county of Los Angeles and State of California, have invented new and useful Improvements in Coin-Operated Shoe-Polishing Machines, of which the following is a specification.

This invention relates to a shoe polishing machine and particularly pertains to a coin controlled shoe polishing apparatus.

It is the principal object of this invention to provide a machine for polishing shoes which is controlled in its movement by the deposit of a coin within a part of the mechanism and which will act in an automatic manner to supply a paste to the shoes and thereafter polish them.

Another object of this invention is to provide a device of the above character which will conform automatically to the contour of the shoe and will thoroughly rub the surface thereof with a pressure substantially equal at all times, thereby insuring that the shoes will be thoroughly polished, irrespective of their size or style.

Other objects will appear hereinafter.

The invention is illustrated, by way of example, in the accompanying drawings in which:

Fig. 4 is a view in section and elevation illustrating the opposite side of the machine and particularly disclosing the horizontal turret gearing, as well as the paste box actuating mechanism, the view being taken looking in the direction of the arrows 4 in Figs. 1 and 2.

Fig. 5 is a diagrammatical view in plan illustrating the horizontal turret carriage and more particularly disclosing the feed mechanism therefor, the view being on a plane parallel with Fig. 1 and looking downwardly from the lines 5—5 in Figs. 2 and 3, with parts omitted.

Fig. 6 is a view in vertical transverse section, as seen through one of the horizontal turrets along the line 6—6 of Fig. 5, illustrating the differential drive gearing of the paste and polishing brushes.

Fig. 7 is a view in vertical section and elevation, as seen through the vertical turret on the line 7—7 of Fig. 3, illustrating its driving mechanism.

Fig. 8 is an enlarged fragmentary view of one of the carriage trips, as seen in plan, the view being taken looking downwardly from the line 8—8 in Fig. 3 with the carriage in position to be tripped.

Fig. 9 is an enlarged fragmentary view in plan illustrating the horizontal turret escapement mechanism, the view being taken looking downwardly from the line 9—9 in Fig. 4.

Fig. 11 is a view in horizontal section through the paste box shown in Fig. 10, as seen on the line 11—11.

Fig. 13 is a view in vertical section disclosing the construction of the vertical turret brush paste box, and taken on the line 13—13 of Fig. 14.

Fig. 14 is a view in front elevation disclosing the driving mechanism of the vertical paste box, and taken looking in the direction of the arrow 14 in Fig. 13.

Fig. 15 is a plan view in section and elevation disclosing in detail the coin operated control switch, the view being taken on the line 15—15 of Fig. 3.

Figure 1:
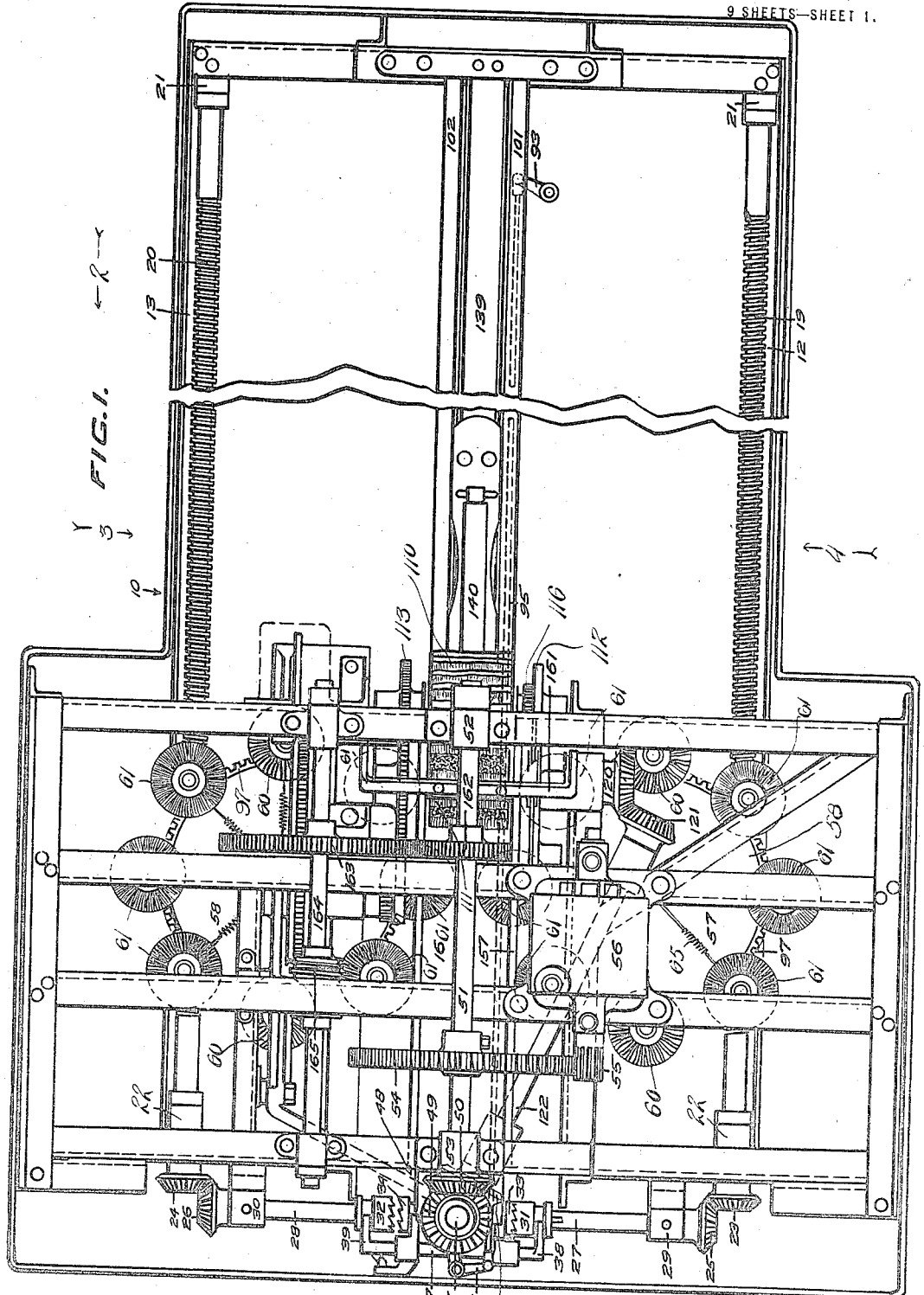
Figure 1 is a view in plan illustrating the entire driving mechanism of the machine and the correlation of its various parts, looking in the direction indicated by the arrow 1 in Fig. 2.

Referring more particularly to the drawings, 10 indicates a cabinet within which the polishing mechanism of the present invention is inclosed. This cabinet comprises a large upright rear portion 10$^a$ and a low forwardly extending platform 10$^b$. The top wall of the platform and the front wall of the upright portion are formed with an opening 11 through which the foot is placed when the shoe is to be polished. It will be understood that the cabinet may be made of wood or sheet metal, as desired, and that the forwardly extending portion will be strong enough to support the weight of the person by whom the machine is actuated.

Extending the full length of the cabinet within the front and upright portions is a guide-way consisting of parallel angle shaped rails 12 and 13. These rails are secured to the floor of the cabinet and provide suitable run-ways for rollers 14 and 15 which are secured beneath a horizontal turret carriage 16. This carriage, as particularly shown in Fig. 5 of the drawings, is rectangular in shape and extends with its long dimensions transversely of the cabinet and the rails. Brackets 17 and 18 are secured beneath the carriage at its opposite ends and are threaded to receive feed screws 19 and 20. These screws extend between and parallel to the rails and when rotated will cause the carriage to move back and forth throughout a horizontal plane of action. The ends of the carriage drive screws are mounted within brackets 21 at one end and brackets 22 at the other end, within which they are rotated by bevel gears 23 and 24 fastened to like ends of the screws and adjacent the brackets 22. These gears mesh with complementary gears 25 and 26 secured at the outer ends of transverse drive shaft portions 27 and 28 which are rotatably held within bearings 29 and 30 upon the floor of the cabinet and form a continuous shaft. The adjacent ends are fitted with jaw clutch sleeves 31 and 32 which may alternately mesh with clutch jaws 33 and 34 formed upon the hubs of bevel gears 35 and 36. These gears are mounted within suitable brackets which also provide support for a double acting shifting rod 37 having clutch fingers 38 and 39 which register with grooves in the hubs of the clutch sleeves and permit them to be slid along the shafts 27 and 28. The mechanism provided to actuate the shifting bar will be hereinafter described.

Figure 3:
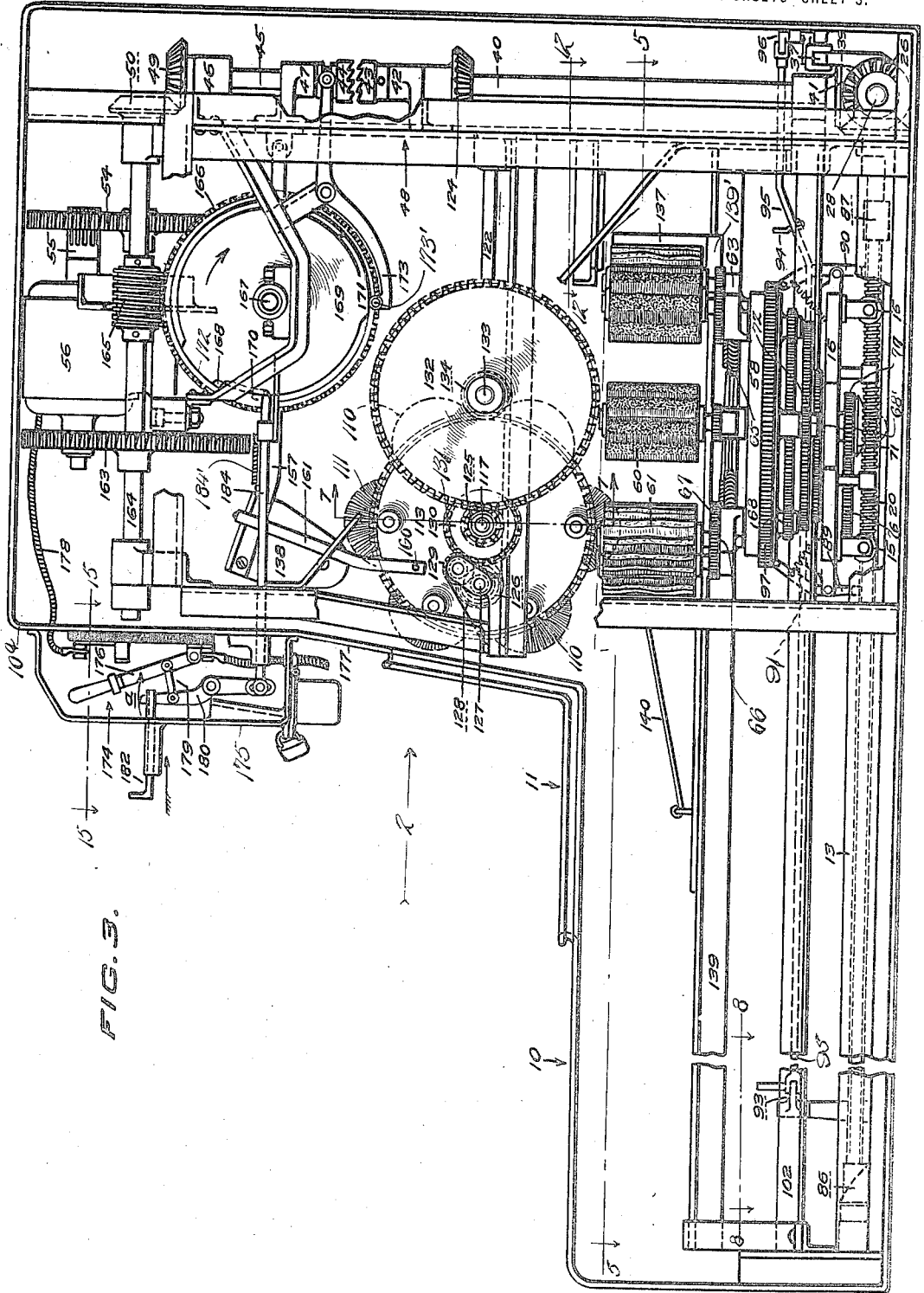
Fig. 3 is a view in side elevation and section illustrating the right-hand side of the machine, as considered from the front and particularly disclosing the coin mechanism and the timing mechanism, the view being taken looking in the direction of the arrows 3 in Figs. 1 and 2.

A vertical drive shaft 40 extends upwardly between the gears 35 and 36 and is provided with a bevel gear 41 in mesh with these two gears. As shown in Fig. 3, this shaft is carried upwardly and is rotatably secured at its upper end within a bearing bracket 42 above which a clutch member 43 is fixed. The clutch member may be engaged by a moving clutch member 44 which is slidably held upon an auxiliary vertical drive shaft 45 disposed in longitudinal alinement to the shaft 40 and rotatably held within bearings 46 and 47. It will be understood that the bearings 46 and 47 are mounted upon upright angle members 48 of the mechanism frame which is inclosed within the cabinet. To the upper end of the shaft 45 is fixed a bevel gear 49 which meshes with a gear 50 upon the horizontal jack shaft 51 rotatably secured within bearings 52 and 53 upon the top of the mechanism frame. As shown in Fig. 4, the shaft 51 is driven by a large spur gear 54 in mesh with a driving pinion 55 secured to the armature shaft of an electric motor 56. This motor, as particularly shown in Figs. 3 and 4, is carried upon the main frame of the mechanism at the top of the cabinet. Through the gears and shafts as described, the carriage feed screws 19 and 20 are driven.

Mounted upon the carriage are horizontal turrets 57 and 58, as shown in Fig. 5, and one of which is particularly disclosed in Fig. 6 of the drawings. Each turret consists of a horizontally disposed circular head 59 upon which are supported paste applying brushes 60 and polishing brushes 61. These brushes are mounted upon rotatable vertical shafts 62. The lower ends of these shafts are rotatably held within swinging arms 63 which are pivotally mounted upon drive shafts 64 arranged at intervals around the circumference of the head 59. The swinging arms 63 are yieldably held by coil springs 65 and maintain the brushes in an outwardly extending position to yieldably bear against the sides of a shoe. Attention is directed to the fact that the arms are angularly disposed in the direction of rotation of the turrets which, in the case of the horizontal turrets, is rearwardly along the sides of the shoe.

The brushes upon the heads are rotated while floating. This is accomplished by placing gears 66 upon the spindles 62. These gears are in mesh with small pinions 67 on the drive shafts 64. The drive shafts of the polishing brushes 61 are adapted to rotate at high speed and are therefore fitted with pinions 68 in mesh with a large driving gear 69 which is fixed to the central post 70 of the turret. This post extends upwardly to provide a rotatable support for the head 59 and downwardly through the carriage 16 to receive a bevel driving gear 71. In this manner the polishing brushes 61 are driven from a mechanism which will be hereinafter disclosed.

The low speed paste brushes 60 are driven through gears 66 upon their spindles which are in mesh with gears 67 upon their drive shafts 64'. The gears 68', upon the lower ends of the low speed brush shafts 64', are in mesh with a large reduction gear 72 mounted to freely rotate upon the post 70 and fixed to rotate with a smaller reduction gear 73 which is driven by a gear 74 secured to a short shaft 75 extending through the carriage 16. The lower end of this shaft 75 is provided with a large reduction gear 76 in mesh with a smaller reduction gear 77 secured upon and adapted to rotate with the post 70. Due to this reduction, the brushes 60 are driven at a much lower rate of speed than the brushes 61.

Figure 2:
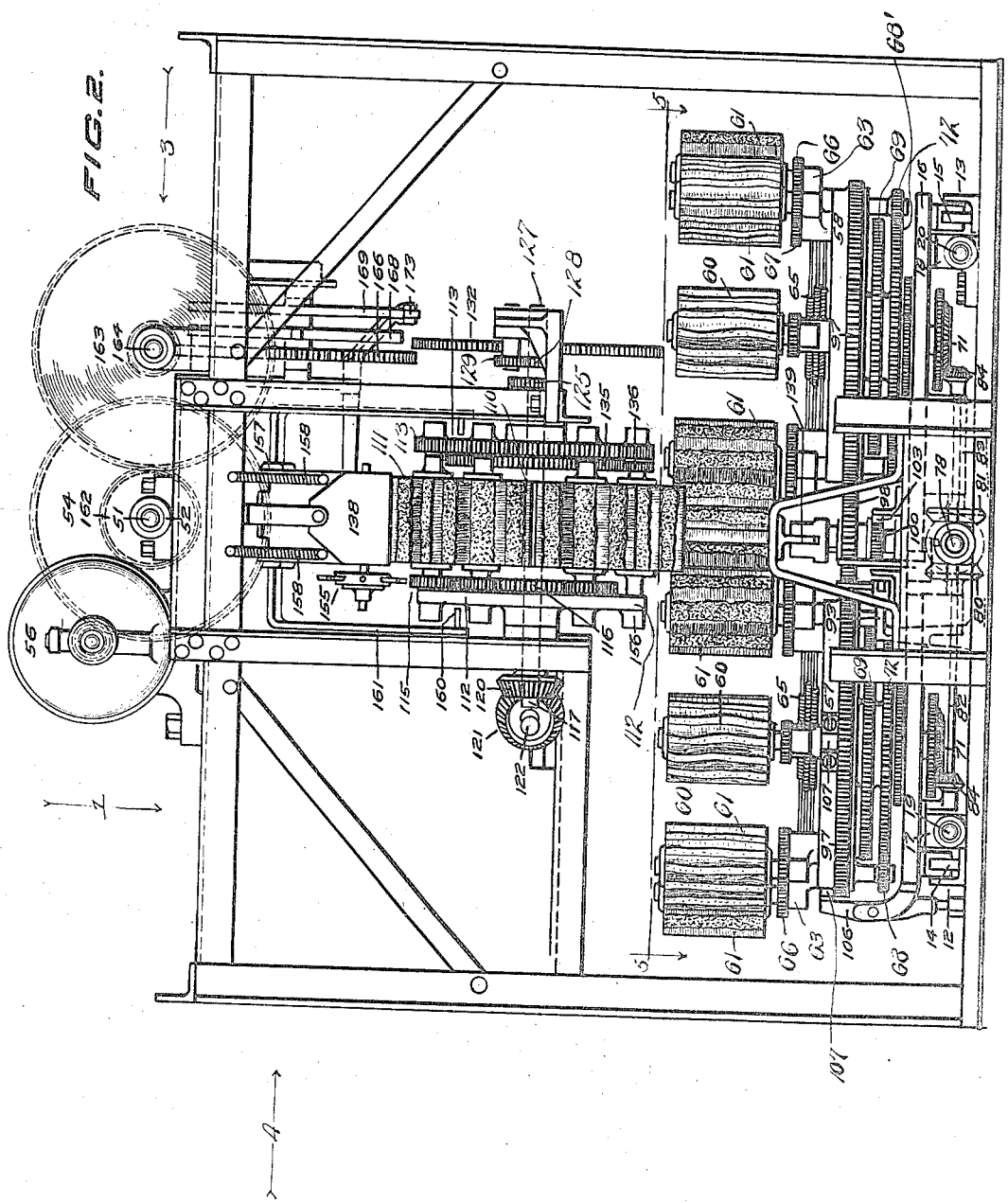
Fig. 2 is a view in front elevation looking in the direction indicated by the arrows 2 in Figs. 1 and 3, illustrating the disposition of the horizontal and vertical polishing turrets in relation to each other, and further disclosing their driving mechanism, as well as the timing mechanism of the machine.

Referring to Fig. 2, the post 70 of each of the turrets is driven from a central splined driving shaft 78 which extends parallel to the carriage feed shafts and midway therebetween. A sliding bevel gear 79 is mounted upon this splined shaft and engages bevel gears 80 and 81 mounted upon shafts 82 and 83 beneath the carriage. The outer ends of these shafts are fitted with gears 84 which mesh with the gears 71 on the posts 70. As shown in Fig. 6, a yoke 85 is secured to the under side of the carriage and is adapted to engage a groove in the hub of the gear 79, thus causing it to slide along the shaft 78 as the carriage moves. It will be further noted that the gear 72, the gear 69, and the head 59 are superimposed one above the other upon the carriage 16 and fitted with antifriction bearings which will permit them to rotate in relation to each other.

As the screws 19 and 20 rotate to move the carriage along the frame it is necessary to provide trip means for reversing the rotation of the screws at the ends of the carriage travel. A detailed view of one of the trip members is shown in Fig. 8 and both trip members are shown in Fig. 5 where it will be seen that cylinder cams 86 and 87 are mounted at the ends of the splined shaft 78 and are engaged by the rollers 88 of tripping arms 89 and 90 which are pivotally mounted for vertical movement upon opposite sides of the carriage and central thereof. The tripping arms have upward extensions which are held by tension springs 91 to cause the roller ends 88 to extend outwardly from the carriage. Pins 92 are secured to the upper ends of each of these arms, one upon the arm 89 being adapted to engage a lug upon a trip arm 93 at the front of the machine. The pin on the opposite lever engages a lug 94 secured upon a rod 95. This rod connects at one end with the trip arm 93 and at the other end with a bell crank 96 which is disposed in the rear of the transverse driving shaft composed of parts 27 and 28. The opposite leg of this bell crank is pivotally secured to the clutch shifting bar 37 and will alternately move the clutch members 31 and 32 into engagement with their complementary clutch jaws as the pins 92 upon the tripping levers 89 and 90 alternately strike the lug upon the trip arm 93 and the lug 94 upon the rod 95, after which engagement of the rollers with the cam will release the pins and free the trip.

During the operation of the various paste and polishing rollers it is necessary to expose the shoe to their action separately and successively. For this purpose rim gears 97 are formed around the outer peripheries of the turret heads 59. These gears are in constant mesh with an idler gear 98 disposed between them upon a vertical shaft 99. The lower end of this shaft is fitted with an intermittently actuated pinion 100 which passes along the machine between guide rails 101 and 102 disposed at opposite sides of the splined shaft 78 and strikes a gear rack 103 secured along the inner face of one of the rails at the termination of the rearward travel of the carriage and a similar gear rack 103' on the other rail near its forward end. Referring particularly to Fig. 9, it will be seen that the pinion 100 is connected to the shaft 99 by spring pressed pawls 104 which engage a ratchet 105 upon the shaft. The movement of the carriage in the direction of the arrow $a$ will cause the shaft 99 and the gears 98 and 100 to rotate in the direction of the arrow $b$ which will rotate the two turrets in the directions of the arrows $c$ and $d$, respectively.

These turrets are normally locked against rotation by locking fingers 106 which engage notches 107 disposed at 90 degrees to each other around the outer periphery of one of the turret heads. (See Fig. 2.) This finger is pivoted to swing vertically toward and away from the side of the turret when it engages one of the trip bars 108 and 109 disposed at the front and rear of the machine, as particularly shown in Fig. 5.

Reference being had to Figs. 2 and 7 it will be seen that the vertical turret, which is disposed above the central line of travel of the carriage is provided with a series of polishing brushes 111 and a series of paste applying brushes 110. These brushes are cylindrical in shape, as are the previously described brushes 60 and 61, and are rotatably driven. Spaced turret heads 112 and 113 are provided as supports for the ends of the brush spindles 114. These spindles are rotatably held within these heads. The spindles of the polishing brushes 111 are provided with gear pinions 115 which are in mesh with a large driving gear 116 which is secured upon the horizontal main shaft 117 of the turret. This shaft also provides support for the turret heads 112 and 113 and is mounted within brackets 118 and 119 fixed to frame members of the machine. A bevel gear 120 is secured at one end of the turret shaft 117 and is in mesh with a similar gear 121 mounted upon an angularly disposed transmission shaft 122 which leads to the main vertical driving shaft 40 of the machine and connects therewith a gear 123 in mesh with a gear 124 upon the shaft, thus imparting motion to the turret shaft 117 and the gear 116 from the drive shaft 40. Referring to Figs. 2, 3 and 7, the opposite end of the turret shaft is fitted with a spur gear 125 which is fixed to the shaft and is in mesh with a small spur gear 126 mounted upon an auxiliary shaft 127. A reduction gear 128 is secured upon the opposite end of the shaft 127 and is in mesh with an intermediate gear 129. This gear 129 meshes with a floating gear 130 upon the end of the turret shaft and is formed integral with a small gear 131, in turn in mesh with a large gear 132 secured to a reduction shaft 133. The opposite end of this shaft is provided with a small gear 134. The turret head 113 is formed with teeth 113' around its edge and these teeth are in mesh with the gear 134. Thus the turret is revolved. Motion is imparted to the slow speed paste brushes 110 by the action of a fixed gear 135 which is provided with a hub 135' around which the turret head 113 rotates and through which the shaft 117 extends and the hub 135' is thereafter fixed in the bearing 119 by a set screw 119'. The teeth of this gear 135 are in mesh with a spindle gear 136 by which the brushes 110 are driven.

The horizontal turret brushes are arranged in this order:

A paste brush 60, three cleaning and polishing brushes 61, a second paste brush 60, and three other cleaning and polishing brushes 61, thus making eight brushes to each horizontal turret. The vertical turret is provided with two cleaning and polishing brushes 111, a paste brush 110, two other cleaning and polishing brushes 111, and a second paste brush 110, thus making six brushes in all. It will be understood that the paste brushes on both turrets are rotating at low speed and that the cleaning and polishing brushes are rotating at high speed. The paste brushes are provided with a polishing paste, part of which is carried within the horizontal paste box 137 for the supply of the horizontal turret and the remainder is carried in a vertical paste box 138 for the supply of the vertical turret.

Figure 10:
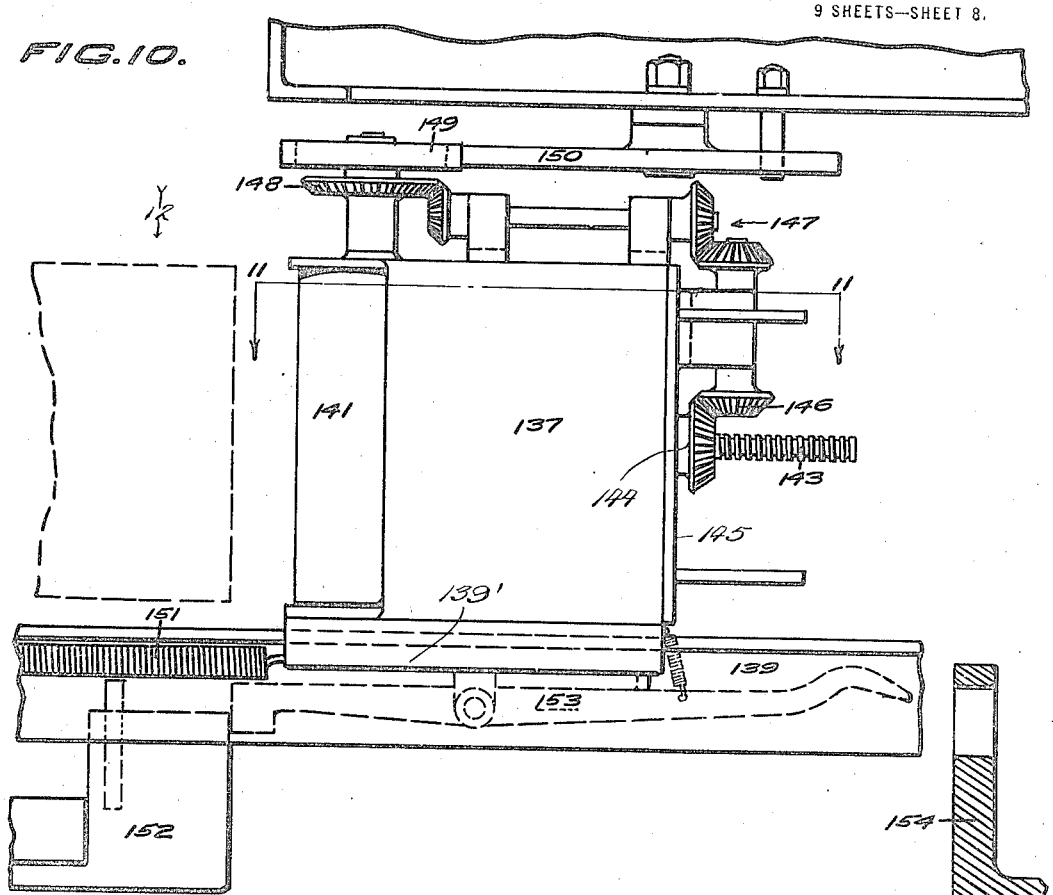
Fig. 10 is a fragmentary view in side elevation illustrating the paste box for the horizontal turret brushes and the actuating mechanism therefor, the view being taken looking in the direction of the arrow 10 in Fig. 11.
Figure 12:
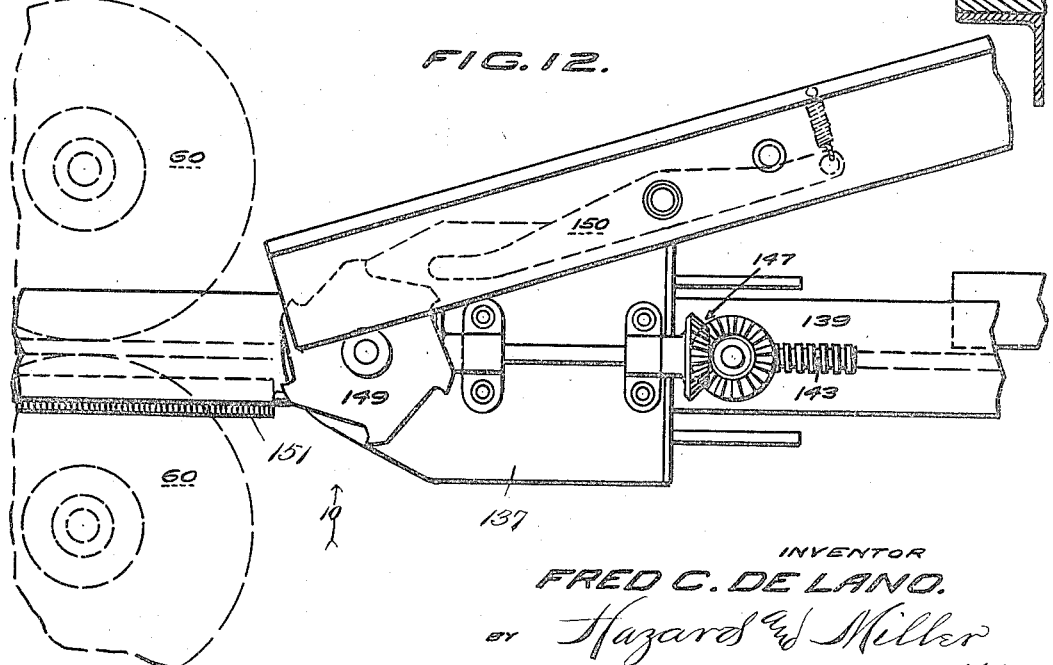
Fig. 12 is a fragmentary view in plan, as seen looking in the direction of the arrow 12 in Fig. 10, illustrating the feed trip of the horizontal paste box, the view being taken as looking downwardly from the line 12—12 in Fig. 3.

As shown in Figs. 10, 11 and 12, the paste box 137 is slidably mounted upon a longitudinally extending T-shaped bar 139 by a slide-way 139', and said bar 139 extends the full length of the machine and supports a foot-rest 140. As particularly shown in Fig. 10, the paste box has a V-shaped front end within which a serrated dispensing cylinder 141 is rotatably positioned. This cylinder normally closes the opening in the end of the paste box and when rotated will carry out a quantity of paste to be spread upon the paste brushes 60. A false back 142 is positioned within the box and provides a forced feed for the paste. This back has a fixed screw 143 extending rearwardly from it and through a nut 144 rotatably held in the back plate 145 of the box. The nut 144 has beveled gear teeth formed around it which are in mesh with a bevel pinion 146 driven by a suitable gear transmission 147 in connection with a pinion 148 upon the stem of the dispensing cylinder 141. This stem is intermittently rotated by the action of a star wheel 149, with which it is provided, and a tripping finger 150 secured to the frame of the machine. As the paste box is slid rearwardly against the contraction of the spring 151 which connects the slideway 139' to the frame of the machine, the teeth of this star wheel encounter the end of the finger 150 and remain in engagement therewith a sufficient length of time to cause the dispensing cylinder 141 to rotate and deliver paste from the box 137 to the brushes 60.

The paste box 137 is moved along the rail 139 by engagement of a finger 152 with a tripping pawl 153. The finger extends upwardly from the rear of the carriage 16 and the tripping pawl is pivotally mounted to the sliding base 139' of the paste box. The forward end of this pawl encounters the finger 152 and is carried with the carriage 16 until the rear end of the pawl strikes a release lug 154, thus swinging the pawl upwardly and discontinuing the movement.

Reference being had to Fig. 13, it will be seen that the paste box 138 is fitted with a dispensing cylinder 141 and operates to release the paste in the same manner as 137. Rotation of this cylinder is effected, however, by a spider wheel 155 which intermittently engages pins 156 extending outwardly from the sides of the turret head as shown in Fig. 2. The feed of the paste is effected by a mechanism identical with that used in the horizontal paste box. The vertical paste box 138 is yieldably mounted from the frame upon pivoted arms 157 which are normally supported by coil springs 158 fastened at their other ends to the frame of the machine. Downward movement of the paste box into engagement with the paste brushes is effected by cam fingers 159 which are secured to the side faces of the turret heads and engage drawing pins 160 fastened at the lower ends of a yoke 161 connected to the paste box.

In the operation of the machine it is necessary to start the mechanism, cause it to polish one shoe and then rest while the other foot is being placed in position upon the foot-rest 140. This is automatically accomplished by a timing mechanism, particularly shown in Figs. 1 and 3. As has been before noted, the motor 56 drives the jack shaft 51 constantly. The timer driving gear 162 is secured to this shaft 51 and is in mesh with a large driven gear 163. This gear is secured upon a worm shaft 164 which also carries a worm gear 165. The worm gear is in mesh with a large worm wheel 166 fastened upon a cam timing shaft 167. Two cams are mounted upon this shaft, one being a lock and release cam 168, while the other is an intermittent motion cam 169. The first-named cam is fitted with a lock groove 170, the second cam has two swells, a long one 171, and a short one 172, both of which are adapted to be encountered by a roller 173' carried by a cam arm 173. The outer end of this arm is formed with a yoke which engages and controls the movement of clutch member 44 and establishes and discontinues the rotation of the vertical driving shaft 40, which, in turn, will control the movement of the carriage and its turrets, as well as the vertical turret.

The motor circuit is controlled by a coin operated switch mechanism 174 which is secured in an accessible position on the front of the cabinet in a case 175. This mechanism is particularly shown in Figs. 3 and 15 of the drawings. As shown, a two-blade knife switch 176 is mounted within the case and establishes electrical connection between feed conduits 177 and 178. A link 179 forms a connection between the switch blade and the coin lever 180. This lever is pivoted midway its length, its upper end being normally positioned within a slot 181 of a coin slide 182. The lever is actuated by a coin 183 which engages it as the slide is forced inwardly. The lower end of the lever is pivotally connected with a lock bar 184 which extends horizontally into the machine and engages the lock groove 170 formed in the periphery of the lock cam 168. The lock bar 184 is slidingly mounted and is held in engagement with the rest of the cam 168 by a spring 184'. Thus simultaneous movement of the switch and the lock bar will be had when the coin 183 and slide 182 are forced inwardly.

In operation, the coin 183 is placed within the semi-circular opening 181 in the slide 182. The slide is then pushed in the direction of the arrow and will cause the upper end of the lever 180 to be struck by the coin, thus swinging it in the direction of the pointer —a— in Fig. 3. Simultaneous with this movement the switch 176 will establish an electric circuit to the motor. At this time the roller end of the cam lever 173 will be bearing upon the long swell 171 of the intermittent operating cam 169 and the clutch members 43 and 44 will be disconnected. As the cam 168 rotates, the motor will accelerate and by the time the cam lever reaches the end of the swell 171 the speed of the motor will be normal so that the load of the machine may be thrown upon it without distress. When the roller 173' of the lever 173 passes from the swell 171, the vertical shaft 40 will be rotated and will cause motion to the vertical turret driving shaft 122, the carriage feed screws 19 and 20, and the horizontal turret splined shaft 78. Instantly each of these shafts will begin their operation. As the carriage is normally at the rear of the machine, complementary paste brushes 61 will wipe over the feed cylinder of the paste box 137 and will carry these brushes forward and adjacent to each other. During this time all of the horizontal brushes 60 and 61 will be revolving. The turrets, however, will be held against rotation. As the carriage passes toward the front of the machine, the cleaning brushes will first encounter the sides of the shoe and brush rearwardly therealong. At the same time, the brushes at the top of the shoe upon the vertical turret will brush downwardly and forwardly over the shoe. When the carriage reaches the forward end of the machine, the trip member 89 will encounter the actuating arm 93 and will draw upon the bar 94 to shift the clutch sleeves 31 and 32, thus reversing the movement of the screws and permitting the machine to pass rearwardly therealong. As the carriage approaches the forward end of the machine, the lock arms 106 will strike the cam block 108 and will swing outwardly from engagement with the lock groove 107 in the periphery of the turret head 57. At this instant the gear 100 will encounter the forward rack 103' and will act through the gear 98 and the rim gears 97 upon the two turrets to revolve them a quarter of a revolution, thus exposing the polishing brushes 61 to the shoe as the turrets return. When the carriage has reached this rear extreme of travel, the trip block 109 will be encountered by the lock lever 106 and will again release the turrets as they strike the rear rack 103 and are rotated another quarter of a revolution. This will swing the second paste brush into a position to touch the sides of the shoe and also to receive paste from the box 137.

The paste box pawl 153 is encountered by the finger 152 upon the rear of the carriage as the carriage reaches the rear end of its stroke and will move the paste box so that the star wheel 149 will strike the finger 150 to rotate the distributing cylinder of the box and expose a predetermined quantity of paste.

Simultaneous to this movement the gear transmission, including gears 148 and 146 will rotate the nut 144 and force the paste forwardly a predetermined distance. As the carriage then moves forward the paste box will move with the carriage until it reaches a predetermined stopping point. During this forward movement the paste brushes are wiping the distributing cylinder of the box and gathering paste, which is thereafter deposited upon the shoe and polished upon the second return trip of the carriage. In this manner it will be seen that the sides of the shoe are subjected to two paste applying and polishing actions.

During the cycle of movement previously described for the carriage the vertical turret is continuously rotating by the driving action of the gear train, previously described. While this rotation is taking place all of the polishing and paste brushes 111 and 110 upon the vertical turret are rotating at their high and low speeds. As the paste brushes reach the top of their travel the cam fingers 159 will encounter the pins 160 of the yoke 161 and draw the paste box down so that the paste may be spread upon the brush, after which the pin passes off the finger and the box is released. After two advancing and retracting movements of the carriage, the cam arm 173 strikes the short swell 172 and discontinues all movements of the turrets and the carriage. The interval of rest is sufficient to allow the polished shoe to be removed from the machine and the other placed therein. The foregoing operation of all of the members is then repeated for two cycles of the carriage travel, after which time the end of the locking bar 184 will fall into the lock groove 170 of the cam 168 and will automatically swing the switch outwardly to discontinue the motor circuit. It will be noted that the locking groove is elongated so that by the time the end of the locking bar strikes the shoulder upon the groove the momentum of the motor will have been decreased to such an extent that the machine may be locked without strain upon any of its parts.

It will thus be seen that the machine here disclosed will act in a positive manner to clean the surface of a shoe, thereafter to apply a paste to this surface in a thorough manner and then to polish the surface, said operation taking place irrespective of the size or shape of the shoe and in an automatic manner.

While I have shown the preferred construction of my coin operated shoe polishing machine as now known to me, it will be understood that various changes in the combination, construction and arrangement of parts may be made by those skilled in the art without departing from the spirit of my invention.

I claim:

1. In a shoe polishing machine, a cabinet, a horizontal guide-way mounted at the bottom of the cabinet and extending forwardly and backwardly, rollers running in the guide-way, a horizontal turret carriage mounted on the rollers and extending transversely of the guide-way, feed screws mounted in the cabinet parallel with the guide-way, brackets extending downwardly from the carriage and screw-seated upon the feed screws, means for operating the feed screws to move the carriage forwardly and backwardly, paste and polishing brushes rotatably mounted upon the carriage, means for operating the brushes as the carriage moves forwardly and backwardly, automatic means for reversing the movement of the carriage, and automatic means for interrupting the operation while the operator is removing one foot and placing the other foot in position to be operated upon by the brushes, said interrupting means including a clutch, a clutch lever extending from the clutch, a rotating cam engaging the free end of the clutch lever and normally allowing the clutch to be closed and a swell upon the cam for engaging the lever to open the clutch.

2. In a shoe polishing machine, a cabinet, guide-ways in the cabinet, rollers running upon the guide-ways, a horizontal turret carriage mounted upon the rollers and extending transversely of the guide-way, horizontal turrets mounted upon the carriage; one on each side of the center; paste and polishing brushes, rotatable vertical shafts upon which the brushes are mounted, swinging arms on said turret in which arms the shafts are rotatably mounted, drive shafts rotatably mounted in the turrets and extending through the swinging arms to pivotally mount the swinging arms, gears connecting the drive shafts to the rotatable shafts, gears fixed upon the lower ends of the drive shafts, shafts vertically mounted through the carriage; the turrets being rotatably mounted upon the upper ends of the shafts; springs connected to the swinging arms, and means for operating the gears upon the lower ends of the drive shafts.

3. In a shoe polishing machine, a horizontally reciprocating carriage, turrets rotatably mounted upon the carriage, gear teeth upon the peripheries of the turrets, an idler gear in mesh with the gear teeth upon the peripheries of the turrets and connecting the turrets, a vertical shaft upon which the idler gear is mounted, a pinion upon the lower end of the shaft, and racks mounted at the ends of the path of travel, one upon each side, to be engaged by said pinion so as to rotate the turrets intermittently as the carriage reciprocates.

4. In a shoe polishing machine, a shaft horizontally mounted, spaced turret heads mounted upon the shaft, paste and polishing brushes rotatably mounted between the heads, a large gear fixed upon the shaft, pinions connected to the polishing brushes and engaging the large gear, a second large gear mounted upon the shaft and held against rotation, pinions carried by the paste brushes and meshing with the second large gear, and speed reducing mechanism connecting the shaft to the second large gear, so as to rotate the paste brushes at a lower speed than the polishing brushes when the shaft is rotated.

5. In a shoe polishing machine, a carriage mounted to reciprocate in a horizontal plane forwardly and backwardly, turrets rotatably mounted upon the carriage, paste and polishing brushes rotatably mounted upon the turrets, means for operating the turrets, means for operating the brushes, a longitudinally extending bar mounted parallel with the path of travel of the carriage, a paste box slidably mounted upon the bar in position to be engaged by the paste brushes, and step by step means for discharging paste to the brushes.

In testimony whereof I have signed my name to this specification.

FRED C. DE LANO.